United States Patent
Pansare et al.

(10) Patent No.: US 8,945,424 B2
(45) Date of Patent: Feb. 3, 2015

(54) LOW TEMPERATURE SULFUR TOLERANT TAR AND SULFUR REMOVAL WITH CONCOMITANT SYNTHESIS GAS CONDITIONING

(75) Inventors: Sourabh S. Pansare, Bartlesville, OK (US); Joe D. Allison, Fulshear, TX (US); Steven E. Lusk, Ponca City, OK (US); Albert C. Tsang, Sugar Land, OK (US)

(73) Assignee: Lummus Technology Inc., Bloomfield, NJ (US)

(*) Notice: Subject to any disclaimer, the term of this patent is extended or adjusted under 35 U.S.C. 154(b) by 454 days.

(21) Appl. No.: 13/231,319

(22) Filed: Sep. 13, 2011

(65) Prior Publication Data

US 2012/0065059 A1    Mar. 15, 2012

Related U.S. Application Data

(60) Provisional application No. 61/382,211, filed on Sep. 13, 2010.

(51) Int. Cl.

| | | |
|---|---|---|
| *C01B 3/22* | (2006.01) | |
| *C01B 3/26* | (2006.01) | |
| *C01B 3/02* | (2006.01) | |
| *B01D 53/52* | (2006.01) | |
| *B01D 53/48* | (2006.01) | |
| *B01D 53/72* | (2006.01) | |
| *C01B 3/58* | (2006.01) | |
| *B01J 21/04* | (2006.01) | |
| *B01J 23/80* | (2006.01) | |

(52) U.S. Cl.
CPC . *C01B 3/58* (2013.01); *B01J 21/04* (2013.01); *B01J 23/80* (2013.01); *C01B 2203/0435* (2013.01); *C01B 2203/045* (2013.01); *C01B 2203/0465* (2013.01); *C01B 2203/0485* (2013.01)
USPC .............. 252/373; 423/244.1; 423/245.1

(58) Field of Classification Search
USPC .............. 252/373; 502/329; 423/210–248
See application file for complete search history.

(56) References Cited

U.S. PATENT DOCUMENTS

| | | | | |
|---|---|---|---|---|
| 3,441,370 | A | * | 4/1969 | Gutmann et al. .......... 423/244.1 |
| 3,673,078 | A | | 6/1972 | Kirk, Jr. |
| 3,709,832 | A | * | 1/1973 | Ao .............................. 502/159 |
| 3,893,949 | A | * | 7/1975 | Sakai et al. .................. 502/241 |

(Continued)

FOREIGN PATENT DOCUMENTS

| | | |
|---|---|---|
| CA | 2381983 A1 | 3/2001 |
| CN | 1613557 A | 5/2005 |

(Continued)

OTHER PUBLICATIONS

PCT Notification of Transmittal of the International Search Report and the Written Opinion of the International Searching Authority, or the Declaration, International Application No. PCT/US2011/051381, International Filing Date Sep. 13, 2011, 13 pages.

Bain, et al., "Evaluation of Catalyst Deactivation during Catalytic Steam Reforming of Biomass-Derived Syngas," Ind. Eng. Chem. Res., 44:7945-56 (2005). Not relevant, Ni catalyst from 775° C. -875° C.

(Continued)

*Primary Examiner* — Wayne Langel
(74) *Attorney, Agent, or Firm* — Osha · Liang LLP

(57) ABSTRACT

A catalyst comprising of NiO; $Al_2O_3$; and ZnO. The catalyst is capable of greater than 5% sulfur removal from a synthesis gas at a temperature range from 300° C. to 600° C.

11 Claims, 2 Drawing Sheets

(56) References Cited

U.S. PATENT DOCUMENTS

| | | | |
|---|---|---|---|
| 3,898,183 A * | 8/1975 | Sugier et al. | 502/302 |
| 4,325,810 A | 4/1982 | Alford et al. | |
| 4,409,131 A | 10/1983 | Fetchin | |
| 4,990,318 A * | 2/1991 | Kidd | 423/230 |
| 5,045,522 A * | 9/1991 | Kidd | 502/405 |
| 5,143,706 A * | 9/1992 | Schubert | 423/230 |
| 5,178,843 A * | 1/1993 | Delzer et al. | 423/220 |
| 5,244,641 A * | 9/1993 | Khare | 423/220 |
| 5,439,867 A | 8/1995 | Khare | |
| 5,494,653 A | 2/1996 | Paisley | |
| 5,882,614 A * | 3/1999 | Taylor et al. | 423/230 |
| 6,084,135 A | 7/2000 | Wachs | |
| 6,171,566 B1 | 1/2001 | Ku | |
| 6,254,766 B1 | 7/2001 | Sughrue et al. | |
| 6,656,877 B2 | 12/2003 | Sughrue et al. | |
| 6,736,963 B2 | 5/2004 | Pradhan et al. | |
| 6,762,143 B2 | 7/2004 | Shan et al. | |
| 7,297,655 B2 | 11/2007 | Mesters | |
| 7,544,285 B2 | 6/2009 | Domokos et al. | |
| 7,663,011 B2 | 2/2010 | Shan et al. | |
| 8,236,262 B2 * | 8/2012 | Potter et al. | 423/244.02 |
| 8,314,047 B2 * | 11/2012 | Macleod et al. | 502/329 |
| 2003/0064887 A1 * | 4/2003 | Korotkikh et al. | 502/329 |
| 2004/0126296 A1 * | 7/2004 | Motal et al. | 423/244.01 |
| 2007/0169412 A1 | 7/2007 | Sinquefield et al. | |
| 2011/0062387 A1 * | 3/2011 | Anfang et al. | 252/373 |

FOREIGN PATENT DOCUMENTS

| | | |
|---|---|---|
| DE | 2232027 A1 | 1/1973 |
| EP | 1382640 | 2/1975 |
| EP | 0401789 | 12/1990 |
| EP | 0401789 A1 | 12/1990 |
| EP | 1224970 | 7/2002 |
| SU | 959821 A1 | 9/1982 |
| WO | 2009007061 | 1/2009 |
| WO | 2009112855 | 9/2009 |

OTHER PUBLICATIONS

Dayton, "A Review of the Literature on Catalytic Biomass Tar Destruction", Golden, CO, National Renewable Energy Laboratory (2002).

Dou, B. et al., "High-Temperature Removal of NH3, Organic Sulfur, HCI, and Tar Component from Coal-Derived Gas", Industrial and Engineering Chemistry Research, 41:4195-200 (2002).

Dou, et al., "Catalytic cracking of tar component from high-temperature fuel gas," Applied Thermal Engineering 23:2229-39 (2003).

Dou, et al, "Removal of Tar Component Over Cracking Catalysts from High Temperature Fuel Gas" Energy Conversion and Management 49:2247-53 (2008).

El-Rub, et al., "Review of Catalysts for Tar Elimination in Biomass Gasification Processes," Industrial and Engineering Chemistry Research 43:6911-9 (2004).

Farrell and Gopal, "Bioenergy Research Needs for Heat, Electricity, and Liquid Fuels" MRS Bulletin 33:373-380 (2008).

Pedersen, "Catalytic Hydrocracking of Tar from Gasification of Straw", in "Advances in Thermochemical Biomass Conversion", Bridgewater, A. V. (Ed.), Blackie Academic & Professional, 246-64 (1994).

Schmidt, et al., "Laboratory simulated slipstream testing of novel sulfur removal processes for gasification application," Fuel Processing Tech. 89:589-94 (2008).

Taralas and Kontominas, "Kinetic modelling of VOC catalytic steam pyrolysis for tar abatement phenomena in gasification/pyrolysis technologies." Fuel 2004, 83:1235-1245.

Torres, et al., "Hot Gas Removal of Tars, Ammonia, and Hydrogen Sulfide from Biomass Gasification Gas", Catalysis Reviews Science and Engineering, 49:407456 (2007).

U.S. Doe study; "Stability and Regenerability of Catalysts for the Destruction of Tars from Biomass and Black Liquor Gasification", project #DE-FC07-001D13875.

Office Action issued Jul. 30, 2014 in corresponding Chinese application No. 201180043925.9 (w/translation) (12 pages).

* cited by examiner

LOW TEMPERATURE SULFUR TOLERANT TAR AND SULFUR REMOVAL WITH CONCOMITANT SYNTHESIS GAS CONDITIONING

CROSS-REFERENCE TO RELATED APPLICATIONS

This application is a non-provisional application which claims the benefit of and priority to U.S. Provisional Application Ser. No. 61/382,211 filed Sep. 13, 2010, entitled "Low Temperature Sulfur Tolerant Tar and Sulfur Removal with Concomitant Synthesis Gas Conditioning," which is hereby incorporated by reference in its entirety.

STATEMENT REGARDING FEDERALLY SPONSORED RESEARCH OR DEVELOPMENT

None.

FIELD OF THE INVENTION

Catalyst for cleaning and conditioning of synthesis gas from tar and sulfur.

BACKGROUND OF THE INVENTION

Synthesis gas has various impurities such as tars, $H_2S$, $NH_3$ and particulates. Tars, commonly defined as polynuclear aromatic compounds formed in the pyrolysis of carbonaceous materials such as wood, coal, or peat, are responsible for operational problems such as plugging of process lines and fouling of heat exchange surfaces which results in reduced process efficiency and plant shutdowns. Tars have the propensity to act as coke precursors resulting in catalyst deactivation downstream of the gasifier. Additionally some components of tars are known carcinogens. Hence, it is important to remove tars from synthesis gas streams for the economical conversion of synthesis gas to value added products.

The concentrations of tars can vary depending upon feedstocks, gasifier type and operating conditions. Most downstream conversion processes and equipments have zero or very low (in ppb range) tolerance for tars. Although catalytic removal of tars is the simplest and the most economical method, there are no commercialized low temperature (<500° C.) tar removal catalysts even after continued 25 years of research and development efforts. Catalysts currently used in the art require temperatures of at least 600° C., preferably 800° C. which requires heating and expensive equipment. By taking the synthesis gas straight out of the generator absent any additional heating additional costs and machinery are not required.

There exists a need to find a simultaneous tar and sulfur removal catalyst that exhibits: 1) sulfur tolerance for tar removal; 2) resistance to coking; 3) ability to withstand high temperatures and reducing environment; 4) ability to work in the presence of $NH_3$, HCl and some heavy metals; and 5) attrition resistance.

BRIEF SUMMARY OF THE DISCLOSURE

A catalyst comprises or comprising essentially of NiO; Al2O3; and ZnO. The catalyst is capable of greater than 5% sulfur removal from a synthesis gas at a temperature range from 300° C. to 600° C.

In an alternate embodiment the catalyst comprises or comprises essentially of NiO present from 1 to 10 wt %; Al2O3; and ZnO. In this embodiment the catalyst is capable of greater than 20% sulfur removal from a synthesis gas while simultaneously removing tar from the synthesis gas at a temperature range from 350° C. to 550° C. and a pressure range from 14.7 to 1,200 psig.

In another embodiment the process begins by producing a synthesis gas. The synthesis gas is then contacted with a catalyst to produce a treated synthesis gas. In this embodiment the catalyst comprises or comprising essentially of NiO; Al2O3; and ZnO. The catalyst is capable of greater than 5% sulfur removal from a synthesis gas at a temperature range from 300° C. to 600° C. The treated synthesis gas is then introduced to a catalytic chemical reaction. In this embodiment the synthesis gas is not heated prior to contact with the catalyst and the treated synthesis gas is not cooled prior to undergoing the catalytic chemical reaction.

In yet another embodiment the process begins by producing a synthesis gas. The synthesis gas is then contacted with a catalyst to produce a treated synthesis gas. In this embodiment the catalyst comprises or comprises essentially of NiO present from 1 to 10 wt %; Al2O3; and ZnO. The catalyst is capable of greater than 20% sulfur removal from a synthesis gas while simultaneously removing tar from the synthesis gas at a temperature range from 350° C. to 550° C. and a pressure range from 14.7 to 1,200 psig. The treated synthesis gas is then introduced to a catalytic chemical reaction. In this embodiment the synthesis gas is not heated prior to contact with the catalyst and the treated synthesis gas is not cooled prior to undergoing the catalytic chemical reaction.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In one embodiment the catalyst comprises NiO; $Al_2O_3$; and ZnO. In this embodiment the catalyst is capable of greater than 5% sulfur removal from a synthesis gas at a temperature range from 300° C. to 600° C.

In one embodiment the NiO is present from 0.5 to 15 wt %, 1 to 10 wt % or even 7.5 to 12.5 wt %.

In another embodiment the ZnO is present from 0.5 to 15 wt %, 1 to 10 wt % or even 7.5 to 12.5 wt %.

Figure 1:
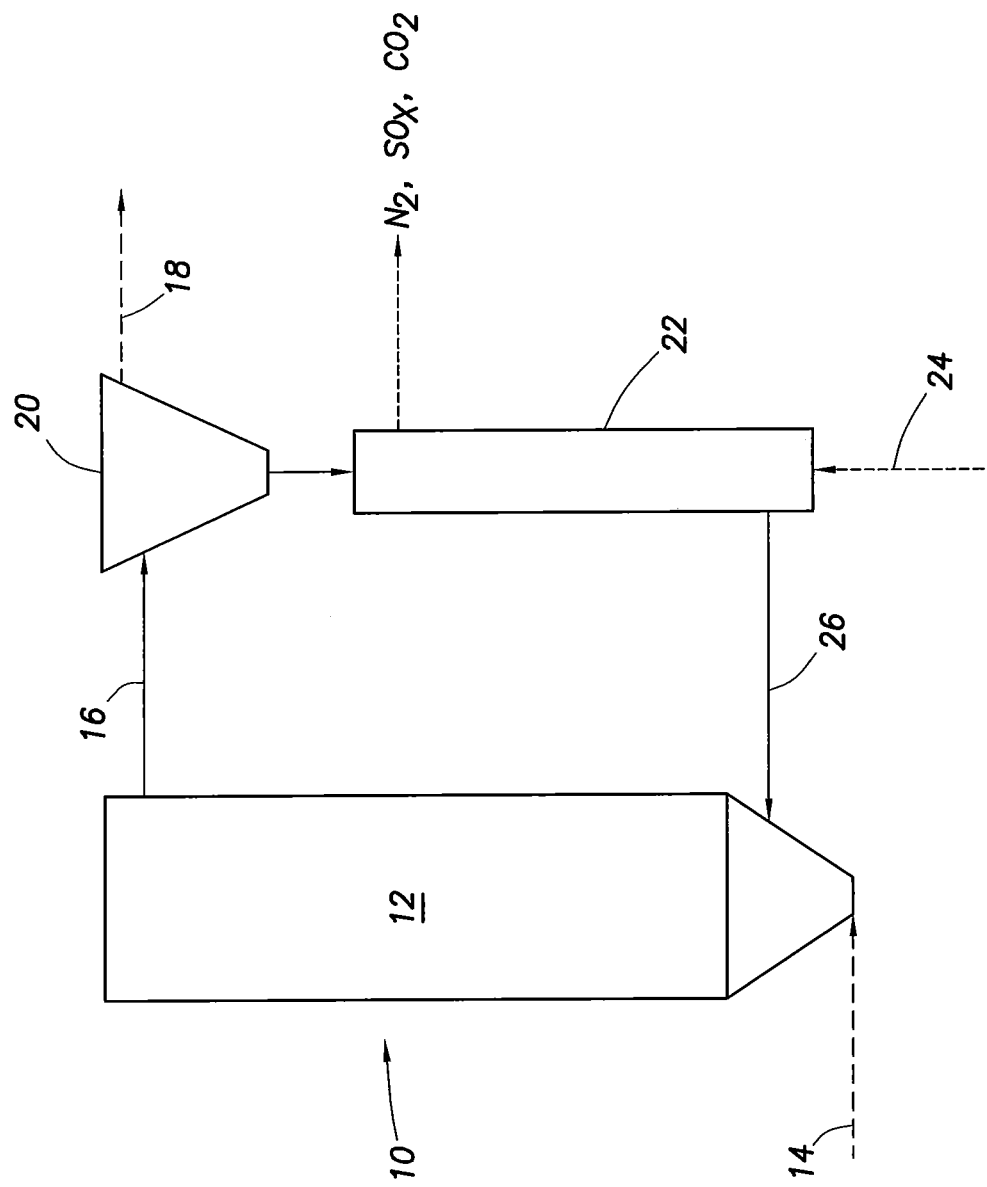
FIG. 1 depicts the setup for a circulating fluidized bed design with a regenerator.

The catalyst can be placed on a fixed bed design or optimally on a circulating fluidized bed design. The reactor setup for this circulating fluidized bed design with a regenerator is shown in FIG. 1. In this figure the fluidized bed reactor 10 contains the catalyst 12. Synthesis gas 14, present with tars and $H_{2S}$ flow into the fluidized bed reactor 10 and reacted with the catalyst 12. The temperature of this reaction step can be less than 425° C., range from 325° C. to 425° C., or even range from 350° C. to 400° C. The pressure of the reaction can be run from 14.7 to 1,200 psig, spent catalyst 16 and the clean synthesis gas 18 are then flowed into a separator 20, such as a cyclone separator, where they are separated. The spent catalyst 16 then flows into a regenerator 22 where air 24 is utilized to regenerate the catalyst into regenerated catalyst 26. The regenerated catalyst then flows into the circulating fluidized bed design to be used as catalyst once again.

The synthesis gas in which the catalyst is reacted with can be any gas mixture that contains varying amounts of carbon monoxide and hydrogen. In one embodiment the synthesis gas feed can contain tar in the form of naphthalene and sulfur in the form of $H_2S$. The amount of tars and sulfur in the synthesis gas feed can be anywhere between a few ppm to 15,000 ppmv depending upon feedstocks, gasifer type and operating conditions.

In one embodiment the synthesis gas is not heated prior to contacting with the catalyst. Catalysts currently used in the art require temperatures of at least 800° C. which requires heating and expensive equipment. By taking the synthesis gas straight out of the generator absent any additional heating additional costs and machinery are not required. Furthermore by contacting the synthesis gas with the catalyst at a temperature range from 300° C. to 600° C. the treated synthesis gas would not need to be cooled prior to being utilized in a catalytic chemical reaction.

The catalytic chemical reaction can include reactions such as a Fischer Tropsch reaction or a methanation reaction or syngas to dimethyl ether to gasoline. The Fischer-Tropsch reaction can be used to produce liquid fuels. Other catalytic reactions can be used to produce synthetic natural gas, gasoline, alcohols, ammonia or other chemical products.

In one embodiment the metal oxide sites can be reduced causing a combination of reduced metal sites and metal oxide sites. The reduction can be achieved by using hydrogen at moderate temperatures to react with the metal oxide to form water and a reduced metal.

In one embodiment the synthesis gas contain more than, 1,000 ppmv of sulfur even more than 10,000 ppmv or even 15,000 ppmv of sulfur. In one example the amount of sulfur from the synthesis gas can range from 10,000 to 20,000 ppmv. Additionally, in one embodiment the catalyst is capable of removing the $H_2S$ to less than 1 ppmv, which is the level typically required for Fischer-Tropsch reactions.

In another embodiment the catalyst comprises from 1-10 wt % NiO; $Al_2O_3$; and ZnO. The catalyst is capable of greater than 20% sulfur removal from a synthesis gas while simultaneously removing tar from the synthesis gas at a temperature range from 350° C. to 550° C. and a pressure range from 14.7 to 1,200 psig or even 250 to 1,000 psig.

In yet another embodiment the process discloses producing a synthesis gas followed by producing a treated synthesis gas by contacting the synthesis gas with a catalyst. In this embodiment the catalyst can comprise NiO; $Al_2O_3$; and ZnO. The treated synthesis gas is then introduced into a catalytic chemical reaction. In this embodiment the synthesis gas is not heated prior to contact with the catalyst and the treated synthesis gas is not cooled prior to undergoing the catalytic chemical reaction.

By not heating the synthesis gas prior to contact with the catalyst additional heating sources are not required. Furthermore additional cooling of the treated synthesis gas is not required prior to the treated synthesis gas undergoing a catalytic chemical reaction.

In another embodiment the process discloses producing a synthesis gas followed by producing a treated synthesis gas by contacting the synthesis gas with a catalyst. In this embodiment the catalyst can comprise from 1-10 wt % NiO; $Al_2O_3$; and ZnO. The catalyst is capable of greater than 20% sulfur removal from a synthesis gas while simultaneously removing tar from the synthesis gas at a temperature range from 350° C. to 550° C. and a pressure range from 250 to 1,000 psig. The treated synthesis gas is then introduced into a catalytic chemical reaction. In this embodiment the synthesis gas is not heated prior to contact with the catalyst and the treated synthesis gas is not cooled prior to undergoing the catalytic chemical reaction.

The following examples of certain embodiments of the invention are given. Each example is provided by way of explanation of the invention, one of many embodiments of the invention, and the following examples should not be read to limit, or define, the scope of the invention.

Example 1

A catalyst was evaluated comprising of 17 wt % Ni and ZnO over an alumina-perlite support. The catalyst was evaluated for naphthalene tar removal at 500 psig and in the temperature range from 350 to 400° C. The synthesis gas stream consisted of 28.5% $H_2$, 42% CO, 12% $CO_2$, 16% $H_2O$ 1.5% $H_2S$ (equivalent to 15,000 ppmv of $H_2S$) and approximately 200 ppmv of naphthalene. The catalyst was reduced in the presence of $H_2$ at 450° C. and an atmospheric pressure for 1.5 hours before starting the reaction. The reaction conditions were 350° C. at 500 psig and 11 $h^{-1}$.

Figure 2:
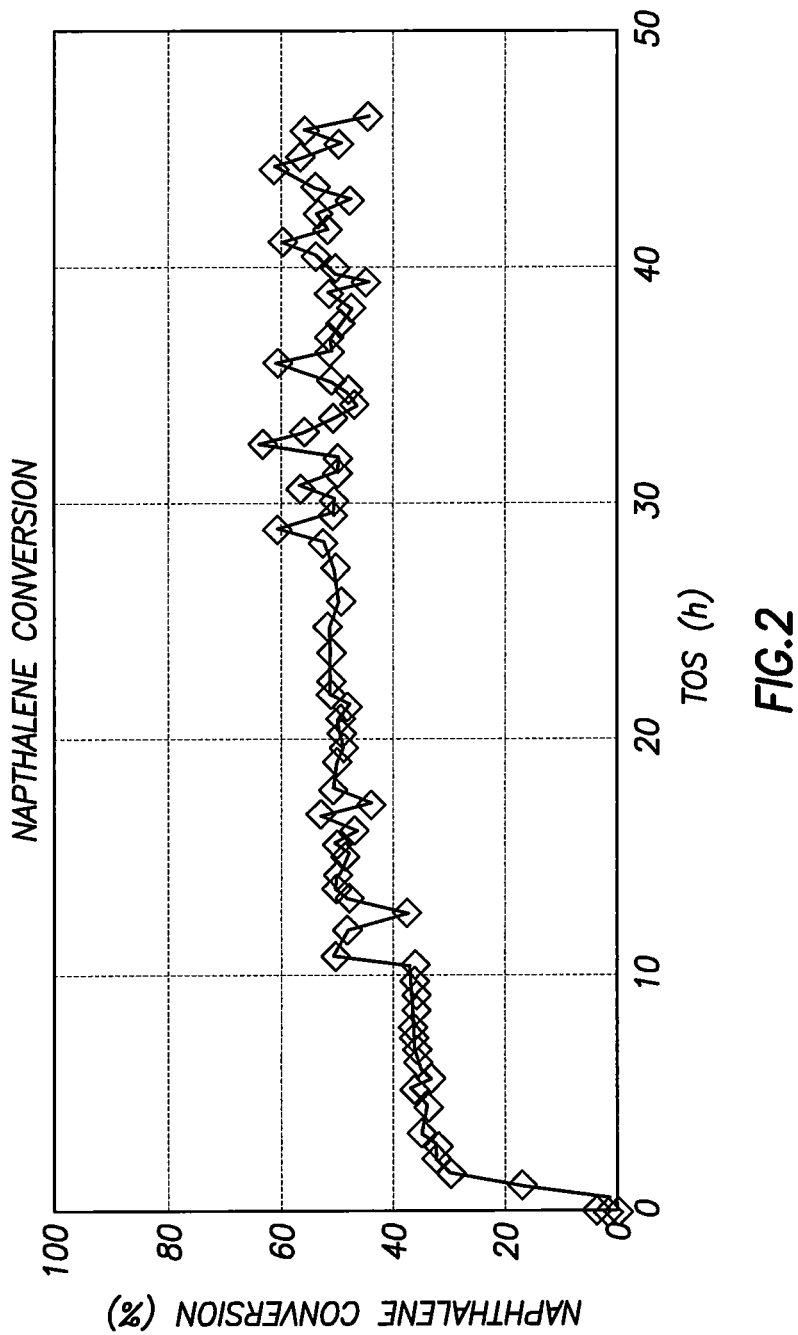
FIG. 2 depicts the naphthalene conversion at 500 psig and 11 $h^{-1}$ at 350° C.

As shown in FIG. 2, 50% naphthalene conversion at the reaction conditions remained constant for 2 days. There were no signs of deactivation of the catalyst. Methane and coke were the main products of the reaction and about 9 wt % carbon was present on the spent catalyst. The analysis of spent catalyst also indicated that it had 21 wt % of sulfur, therefore the catalyst was removing tar and $H_2S$ simultaneously. Additionally, the catalyst is shown to be active for sulfur removal in the presence of $NH_3$ and HCl without any degradation effects.

Example 3

Different catalysts were tested to evaluate their ability for tar cracking, methanation, water gas shift and sulfur removal at low temperatures. In the following tables WHSV means weight hourly space velocity.

Six different catalysts were tested

| Catalyst | Types of sites | Form of metal sites |
|---|---|---|
| Silica-alumina | Acidic sites | — |
| Tungstated zirconia | Acidic sites, some metal | Reduced metal/oxide |
| Ultra-stable Y zeolite | Acidic sites | — |
| NiW/zeolitic support | Metal and acid sites | Sulfide |
| NiMo/zeolitic support | Metal and acid sites | Sulfide |
| Ni, $Al_2O_3$, and ZnO | Metal sites | Reduced metal/oxide |

The ability for the catalysts to perform tar cracking is shown below.

| Catalyst | Temp. range ° C. | Pressure psig | WHSV h−1 | Naphthalene Conversion % |
|---|---|---|---|---|
| Silica-alumina | 400-600 | 500 | 11 | <20% |
| Tungstated zirconia | 400-600 | 500 | 11 | 10-60% |
| Ultra-stable Y zeolite | 400-600 | 500 | 11 | 40-60% |
| NiW/zeolitic support | 400-600 | 500 | 11 | 60-75% |
| NiMo/zeolitic support | 350-550 | 500 | 2.2-11 | >90% |
| Ni, Al2O3, and ZnO | 350-550 | 500 | 11 | 20-60% |

The ability for the catalysts to perform methanation is shown below.

| Catalyst | Temp. range °C. | Pressure psig | WHSV h−1 | Rate of CH4 formation μmole/g cat/s |
|---|---|---|---|---|
| Silica-alumina | 400-600 | 500 | 11 | <20 |
| Tungstated zirconia | 400-600 | 500 | 11 | 100-400 |
| Ultra-stable Y zeolite | 400-600 | 500 | 11 | <10 |
| NiW/zeolitic support | 400-600 | 500 | 11 | 300-700 |
| NiMo/zeolitic support | 350-550 | 500 | 2.2-11 | 150-800 |
| Ni, Al2O3, and ZnO | 350-550 | 500 | 11 | <20 |

The ability for the catalysts to perform water gas shift reactions is shown below

| Catalyst | Temp. range °C. | Pressure psig | WHSV h−1 | CO Conversion % |
|---|---|---|---|---|
| Silica-alumina | 400-600 | 500 | 11 | <5% |
| Tungstated zirconia | 400-600 | 500 | 11 | 20% |
| Ultra-stable Y zeolite | 400-600 | 500 | 11 | <5% |
| NiW/zeolitic support | 400-600 | 500 | 11 | 30% |
| NiMo/zeolitic support | 350-550 | 500 | 2.2-11 | 30-50% |
| Ni, Al2O3, and ZnO | 350-550 | 500 | 11 | 10-20% |

The ability for the catalysts to perform sulfur removal is shown below.

| Catalyst | Temp. range °C. | Pressure psig | WHSV h−1 | Sulfur uptake |
|---|---|---|---|---|
| Silica-alumina | 400-600 | 500 | 11 | 0 |
| Tungstated zirconia | 400-600 | 500 | 11 | 3% |
| Ultra-stable Y zeolite | 400-600 | 500 | 11 | 0 |
| NiW/zeolitic support | 400-600 | 500 | 11 | <0.1% |
| NiMo/zeolitic support | 350-550 | 500 | 2.2-11 | <0.1% |
| Ni, Al2O3, and ZnO | 350-550 | 500 | 11 | 20% |

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process of removing tar compounds from synthesis gas, the process comprising:
   producing a tar-containing synthesis gas;
   producing a treated synthesis gas by contacting the tar-containing synthesis gas with a first catalyst comprising:
   (a) NiO;
   (b) Al$_2$O$_3$; and
   (c) ZnO,
   introducing the treated synthesis gas to a further catalytic chemical reaction;
   wherein the synthesis gas is not heated prior to contact with the first catalyst and the treated synthesis gas is not cooled prior to undergoing the further catalytic chemical reaction.

2. The process of claim 1, wherein the temperature range in which the synthesis gas is contacted with the catalyst is from 350° C. to 550° C.

3. The process of claim 1, wherein the NiO is present from 1 to 10 wt %.

4. The process of claim 1, wherein the catalyst is capable of greater than 5% sulfur removal from a synthesis gas at a temperature range from 300° C. to 600° C.

5. The process of claim 1, wherein the catalyst is capable of removing tar from the synthesis gas at quantities greater than 55% conversion at 350° C.

6. The process of claim 4, wherein the contacting is at a pressure in the range from 14.7 to 1,200 psig.

7. The process of claim 4, wherein the contacting is at a pressure in the range from 250 to 1,000 psig.

8. The process of claim 4, wherein the catalyst simultaneously removes the tar from the tar-containing synthesis gas during the contacting.

9. The process of claim 1, wherein the first catalyst comprises 0.5 to 15 wt % ZnO.

10. A process of:
    producing a raw synthesis gas containing tar compounds and sulfur containing compounds by gasification;
    producing a treated synthesis gas by contacting the raw synthesis gas with a first catalyst comprising:
    (a) NiO present from 1 to 10 wt %;
    (b) Al$_2$O$_3$; and
    (c) ZnO,
    wherein the catalyst is capable of greater than 20% sulfur removal from a synthesis gas while simultaneously removing 20% to 60% of the tar from the raw synthesis gas at a temperature range from 350° C. to 550° C. and a pressure range from 14.7 to 1,200 psig; and
    introducing the treated synthesis gas to a subsequent catalytic chemical reaction;
    wherein the synthesis gas is not heated prior to contact with the first catalyst and the treated synthesis gas is not cooled prior to undergoing the subsequent catalytic chemical reaction.

11. The process of claim 10, wherein the first catalyst comprises 0.5 to 15 wt % ZnO.

* * * * *